(12) United States Patent
Thomas, III et al.

(10) Patent No.: US 11,413,944 B2
(45) Date of Patent: Aug. 16, 2022

(54) CARGO MANAGEMENT SYSTEM

(71) Applicant: NISSAN NORTH AMERICA, INC., Franklin, TN (US)

(72) Inventors: Jim Thomas, III, Southfield, MI (US); Scott Dearing, Walled Lake, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 300 days.

(21) Appl. No.: 16/849,142

(22) Filed: Apr. 15, 2020

(65) Prior Publication Data
US 2021/0323392 A1    Oct. 21, 2021

(51) Int. Cl.
| B60J 11/06 | (2006.01) |
| B60P 7/08 | (2006.01) |
| B29C 48/00 | (2019.01) |
| B29L 31/30 | (2006.01) |

(52) U.S. Cl.
CPC ........... B60J 11/06 (2013.01); B29C 48/0021 (2019.02); B29C 48/0022 (2019.02); B60P 7/0815 (2013.01); B29L 2031/3005 (2013.01)

(58) Field of Classification Search
CPC . B60J 11/06; B60P 7/06; B60P 7/0807; B60P 7/0815; B29C 48/001; B29C 48/0022
USPC .......................................... 296/37.6, 100.04
See application file for complete search history.

(56) References Cited

U.S. PATENT DOCUMENTS

| 3,996,861 | A | * | 12/1976 | Santho | .................. | B60P 7/0815 |
| | | | | | | 410/115 |
| 9,862,335 | B2 | * | 1/2018 | Vu | .......................... | B60R 13/06 |
| 9,908,568 | B2 | * | 3/2018 | Vu | .......................... | B60R 13/01 |
| 2002/0164225 | A1 | * | 11/2002 | Snyder | .................. | B60P 7/0815 |
| | | | | | | 410/104 |
| 2004/0222260 | A1 | * | 11/2004 | Haspel | .................. | B60P 7/0815 |
| | | | | | | 224/324 |
| 2017/0247062 | A1 | * | 8/2017 | Vu | .......................... | B60R 13/01 |

FOREIGN PATENT DOCUMENTS

| EP | 1816031 A2 | 8/2007 |
| GB | 2529499 A | * 2/2016 | ............ B60P 7/0807 |

* cited by examiner

Primary Examiner — Jason S Daniels
(74) Attorney, Agent, or Firm — Global IP Counselors, LLP (57) ABSTRACT

A cargo management system for a vehicle cargo box includes a utility rail and a utility track cover. The utility rail is configured to be installed to the cargo box. The utility track cover is configured to be removably disposed over the utility rail. The utility track cover has a base, a guide rail and a stopper. The guide rail extends along a longitudinal length of the base. The stopper is defined by the guide rail. The stopper is integrally connected to the base at a first contact point and a second contact point between the stopper and the base. The first and second contact points are spaced from one another.

17 Claims, 5 Drawing Sheets

CARGO MANAGEMENT SYSTEM

BACKGROUND

Field of the Invention

The present invention generally relates to cargo management system. More specifically, the present invention relates to cargo management system for a vehicle cargo box.

Background Information

Vehicles, such as trucks or pick-up trucks, can be equipped with a cargo management system that is provided to a vehicle cargo box or truck bed. Typically, cargo management systems include one or more tracks that are installed to the truck bed. Cargo management systems enable vehicle owners to load and store heavy and/or bulky cargo in the cargo box. In particular, cargo management systems utilize channels that accommodate cleats and tie-downs in order to secure cargo along the channels.

SUMMARY

In view of the state of the known technology, one aspect of the present disclosure is to provide a cargo management system for a vehicle cargo box comprising a utility rail and a utility track cover. The utility rail is configured to be installed to the cargo box. The utility track cover is configured to be removably disposed over the utility rail. The utility track cover has a base, a guide rail and a stopper. The guide rail extends along a longitudinal length of the base. The stopper is defined by the guide rail. The stopper is integrally connected to the base at a first contact point and a second contact point between the stopper and the base. The first and second contact points are spaced from one another.

In view of the state of the known technology, one aspect of the present disclosure is to provide a method of forming a utility track cover for a cargo management system. The method comprises using plastic extrusion to form a base and a guide rail. The guide rail has an extension that protrudes from the base. The guide rail extends along a longitudinal length of the base. The method further comprises cutting an end portion of the guide rail. The method further comprises applying force to an edge of the end portion such that the end portion contacts the base. The method further comprises welding the edge of the end portion to the base.

In view of the state of the known technology, one aspect of the present disclosure is to provide a utility track cover for a vehicle cargo management system. The utility track cover comprises a base, a guide rail and a stopper. The guide rail extends along a longitudinal length of the base. The stopper is defined by the guide rail. The stopper, the base and the guide rail together is a one-piece member integrally formed by plastic extrusion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
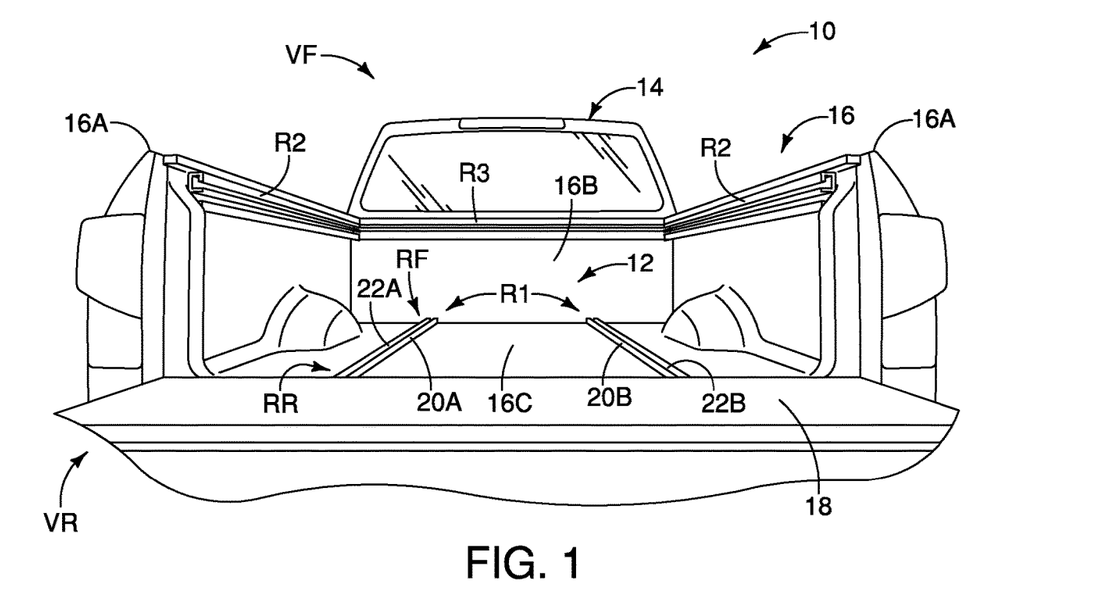
FIG. 1 is a plan view from a rear side of a vehicle equipped with a cargo management system in the vehicle's cargo box.

Referring initially to FIG. 1, a vehicle 10 equipped with a cargo management system 12 is illustrated in accordance with an embodiment. The vehicle 10 is a pick-up truck which is a light-duty truck having an enclosed cab 14 and a cargo box 16 (or truck bed) sized and configured for storing cargo therein. The vehicle 10 includes a tailgate 18 that is movable between an open and a closed position to enable access to the cargo box 16. The cargo box 16 is defined by a pair of side panels 16A that are made of sheet metal, a header 16B that is defined by the back of the enclosed cab 14, a floor, and the tailgate 18. The cargo management system 12 is provided on the cargo box 16. The cargo box 16 is alternatively called a vehicle truck bed of the vehicle 10. Therefore, the cargo management system 12 is for the vehicle truck bed.

Figure 2:
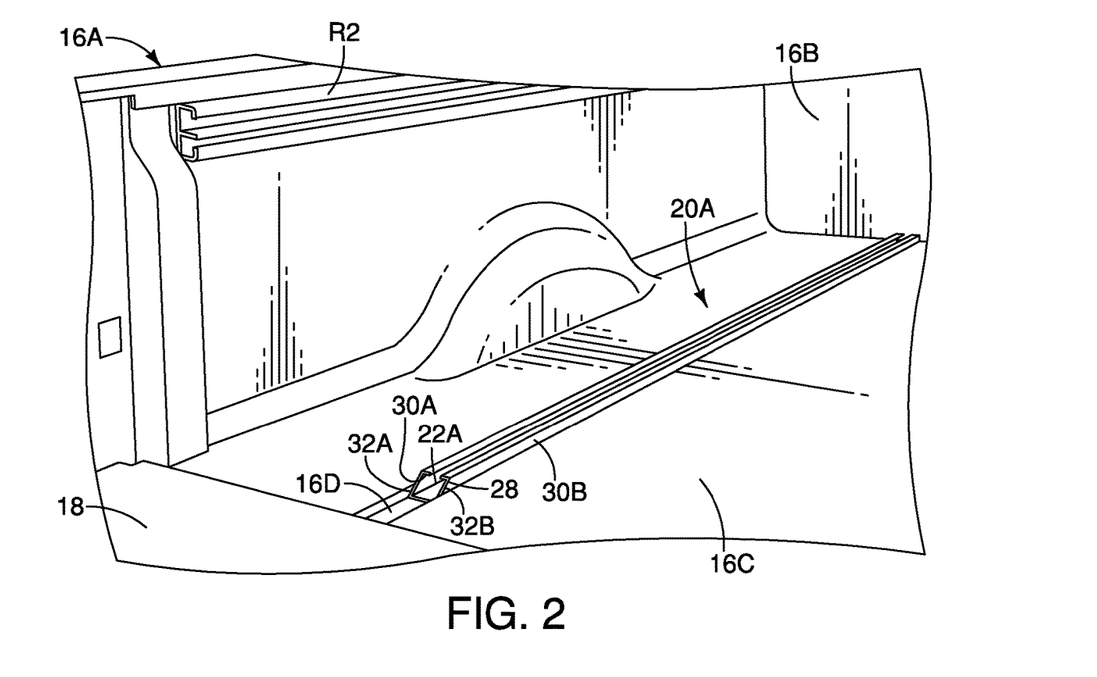
FIG. 2 is an enlarged perspective view of a portion of the cargo management system of FIG. 1.

The cargo management system 12 is an example of a truck accessory system that is typically provided as an aftermarket accessory to the vehicle 10. In the illustrated embodiment, the cargo management system 12 is more specifically an utility track system that is provided to the cargo box 16. For example, as seen in FIGS. 1 and 2, the cargo management system 12 of the illustrated embodiment comprises a utility rail R1 configured to be installed to the cargo box 16. As illustrated, the cargo management system 12 preferably includes a pair of utility rails 20A and 20B that are configured to be installed to the cargo box 16. As seen in FIG. 1, the utility rails 20A and 20B each extend longitudinally along a length of the cargo box 16 that is in a direction between a vehicle front side VF and a vehicle rear side VR.

The cargo management system 12 can accommodate a variety of OEM (original equipment) and/or aftermarket accessories that are to be stored or contained in the cargo box 16. The equipment and/or accessories can be secured to the cargo box 16 by being locked into the utility rails 20A and 20B. For example, each of the utility rails 20A and 20B includes a channel. In particular, the utility rails 20A and 20B define a pair of floor channels 22A and 22B that are installed on the floor of the cargo box 16. Alternatively speaking, the utility rails 20A and 20B can be considered floor rails that are provided to the floor 16C of the cargo box 16. As best seen in FIG. 2, the floor 16C of the cargo box 16 preferably includes corresponding floor channels 16D (only one shown in FIG. 2), each of the corresponding floor channels 16D receive one of the utility rails 20A and 20B therein. The utility rails 20A and 20B are secured to the corresponding floor channels 16D of the floor 16C of the cargo box 16. While the cargo management system 12 of the illustrated embodiment is shown as including a pair of utility rails 20A and 20B that are installed to the floor 16C of the cargo box 16, it will be apparent to those skilled in the vehicle field from this disclosure that the cargo management system 12 can include a single utility rail 20A or additional utility rails 20A and 20B as needed and/or necessary.

Figure 3:
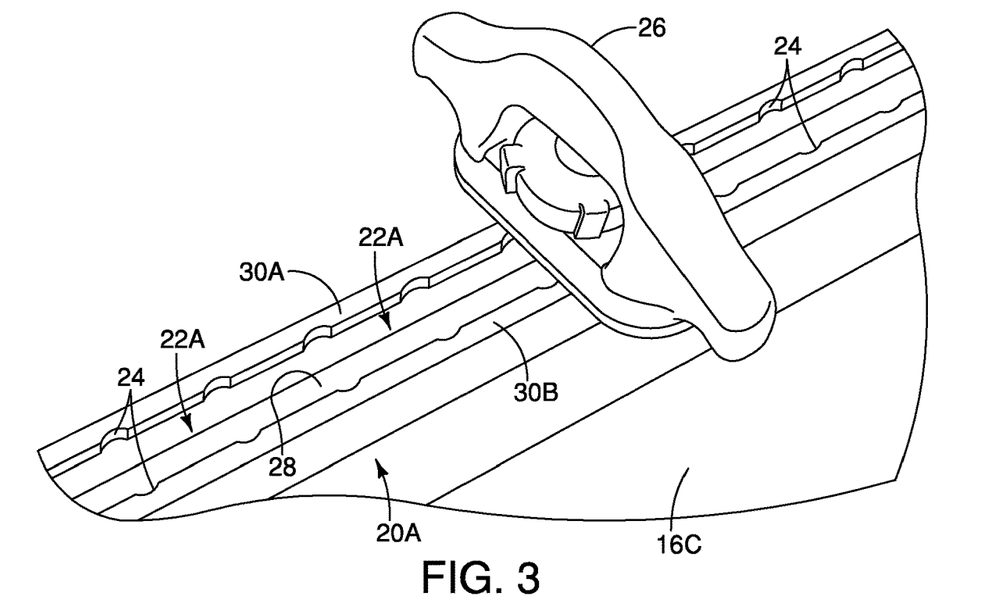
FIG. 3 is an enlarged top view of a portion of the cargo management system showing a cleat accommodated by the cargo management system.

As best seen in FIG. 3, the channels 22A have a plurality of notches 24 that extend along the longitudinal lengths of the utility rails 20A and 20B. The notches 24 of the utility rails 20A and 20B can accommodate tie-downs for the vehicle 10. In particular, the notches 24 can accommodate one or more adjustable cleats 26 within the channels 22A and 22B. Therefore, the cleats 26 serve as tie-downs for equipment (e.g., storage bins) to be stored in the cargo box 16. The cleats 26 can be adjusted along the longitudinal lengths of the utility rails 20A and 20B to be locked into a desired location along the utility rails 20A and 20B.

In FIG. 1, the vehicle 10 is illustrated as being further equipped with a pair of side utility rails R2 having channels that are installed on the side panels 16A of the cargo box 16. The vehicle 10 is further illustrated as being equipped with a header 16B rail having a channel that is installed on the header 16B of the cargo box 16. Therefore, the cargo management system 12 can additionally include the side utility rails R2 and the header rail R3.

Figure 4:
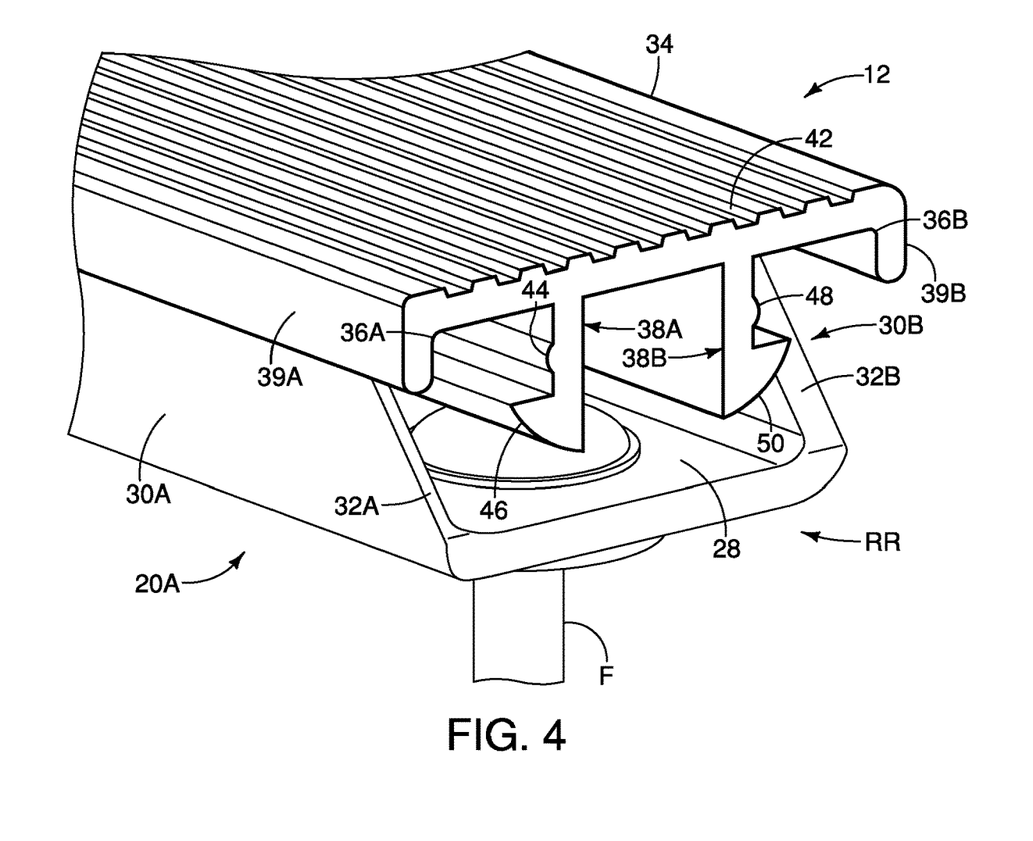
FIG. 4 is an enlarged view of a rear portion of the cargo management system showing a utility rail and a utility track cover disposed over the utility rail.

Referring to FIGS. 2 and 3, the utility rails 20A and 20B will be further discussed. As the utility rails 20A and 20B are identical except for their location on the cargo box 16, only the utility rail 20A will be discussed in detail for brevity. The utility rail 20A has a front side that faces the vehicle front side VF of the vehicle 10. In other words, the front side RF faces the header 16B of the cargo box 16. The utility rail 20A further has a rear side RR that faces the vehicle rear side VR of the vehicle 10. In other words, the rear side RR faces the tailgate 18. The utility rail 20A includes a base 36 that is installed to the corresponding floor channel 16D of the cargo box 16 by bolts, fasteners F or any other appropriate fastening means, as best seen in FIG. 4.

The utility rail 20A further includes a pair of sidewalls 30A and 30B each extending upwards from the lateral edges 36A and 36B of the base 36 away from the floor 16C of the cargo box 16. The sidewalls 30A and 30B include the notches 24 for securing the cleat 26, as seen in FIG. 3. The sidewalls 30A and 30B and the base 36 together define the floor channel 22A of the utility rail 20A. As best seen in FIG. 4, the sidewalls 30A and 30B each include an end wall 32A and 32B disposed at the rear side RR of the utility rail 20A. The end walls 32A and 32B slant in a direction away from the base 36. That is, the end walls 32A and 32B slant in a direction away from the rear side RR of the utility rail 20A towards the front side RF of the utility rail 20A.

Referring to FIGS. 4 to 8, the cargo management system 12 further comprises a utility track cover 34 configured to be removably disposed over the utility rail 20A. The utility track cover 34 serves as a protective cover for the utility rail 20A to protect the utility rail 20A from accumulating dirt or other debris that are difficult to remove or clean. The utility track cover 34 is removed from the utility rail 20A during use of the utility rail 20A. Preferably, the utility track cover 34 is made of a light-weight material that has some degree of flexibility for easy installation and removability. For example, the utility track cover 34 can be made of a synthetic plastic polymer such as polyvinyl chloride (PVC). While the utility track cover 34 is shown as being provided to the utility rails 20A and 20B that are the floor channels 22A and 22B, it will be apparent to those skilled in the vehicle field from this disclosure that the utility track cover 34 can be implemented with the side utility rails R2 and/or the header rail R3, as needed and/or necessary.

During use of a vehicle, it has been found that conventional utility track covers can slide along a utility rail. In particular, a conventional utility track cover tends to slide in a direction toward the vehicle front side and toward the header of the cargo box. Conventional utility track covers can include one or more stoppers and that serve as endpoints for contacting the utility rail at the rear side of the utility rail to prevent the utility track cover from sliding into the header. Conventional stoppers provided to conventional utility track covers are separate members that are subsequently attached or fixed to the conventional utility track cover after the utility track cover is fully formed. During driving and braking of the vehicle, the stopper will contact the utility rail and eventually break due to the repeated impact. The breaking and/or damage to the conventional stoppers is more likely as these stoppers are separately formed from the utility track cover and subsequently attached.

Therefore, the utility track cover 34 of the illustrated embodiment is provided having one or more stoppers 40A and 40B that are made as a one-piece member with the utility track cover 34 such that the stoppers 40A and 40B are securely provided with the utility track cover 34, as will be further discussed below. The utility track has a base 36 having a longitudinal length that substantially corresponds to a longitudinal length of the guide rail. Referring to FIGS. 5 to 8, the utility track cover 34 includes a pair of guide rails that are first and second guide rails 38A and 38B and a pair of stoppers that are first and second stoppers 40A and 40B. Therefore, the utility track cover 34 has the base 36, at least one guide rail 38A and at least one stopper 40A. The guide rail 38B can be considered another guide rail. And the second stopper 40B can be considered another stopper.

The base 36 is disposed over the channel 22A and substantially covers the floor channel 22A of the utility rail 20A. However, it will be apparent to those skilled in the vehicle field from this disclosure that the utility track cover 34 can include a single guide rail and a single stopper, as needed and/or necessary. It will also be apparent to those skilled in the vehicle field from this disclosure that the utility track cover 34 can include additional guide rails and stoppers as needed and/or necessary. The guide rails 38A and 38B are disposed in the floor channel 22A between the sidewalls 30A and 30B of the utility rail 20A. Preferably, the guide rails 38A and 38B are removably disposed in the floor channel 22A by interference fit.

In this way, the stoppers 40A and 40B of the illustrated embodiment are able to withstand a greater impact or contact with the utility rail 20A. The stoppers 40A and 40B of the illustrated embodiment are configured to contact the sidewalls 30A and 30B of the utility rail 20A. More specifically, the stoppers 40A and 40B of the illustrated embodiment are configured to contact the end walls 32A and 32B of the utility rail 20A, as seen in FIG. 4. That is, during use of the vehicle 10 that causes the utility track cover 34 to slide forward with respect to the utility track, the stoppers 40A and 40B will contact the end walls 32A and 32B that are at the rear side of the utility rail 20A. In this way, the utility track cover 34 is prevented from sliding all the way forward and contacting the header 16B of the cargo box 16 due to the impact of the stopper with the utility rail 20A.

In the illustrated embodiment, the stoppers 40A and 40B are defined by the guide rails 38A and 38B. That is, the stoppers 40A and 40B are formed from the guide rails 38A and 38B, as will be further described. In particular, the base 36, the guide rails 38A and 38B and the stoppers 40A and 40B of the utility track cover 34 are together formed as a one-piece member that is integrally formed by plastic extrusion. As stated, the base 36, the guide rails 38A and 38B and the stoppers 40A and 40B are preferably made of PVC. Therefore, the utility track cover 34 is formed by PVC extrusion, as will be further discussed below. In this way, no additional material is required to make the stoppers 40A and 40B for the utility track cover 34.

Figure 5:
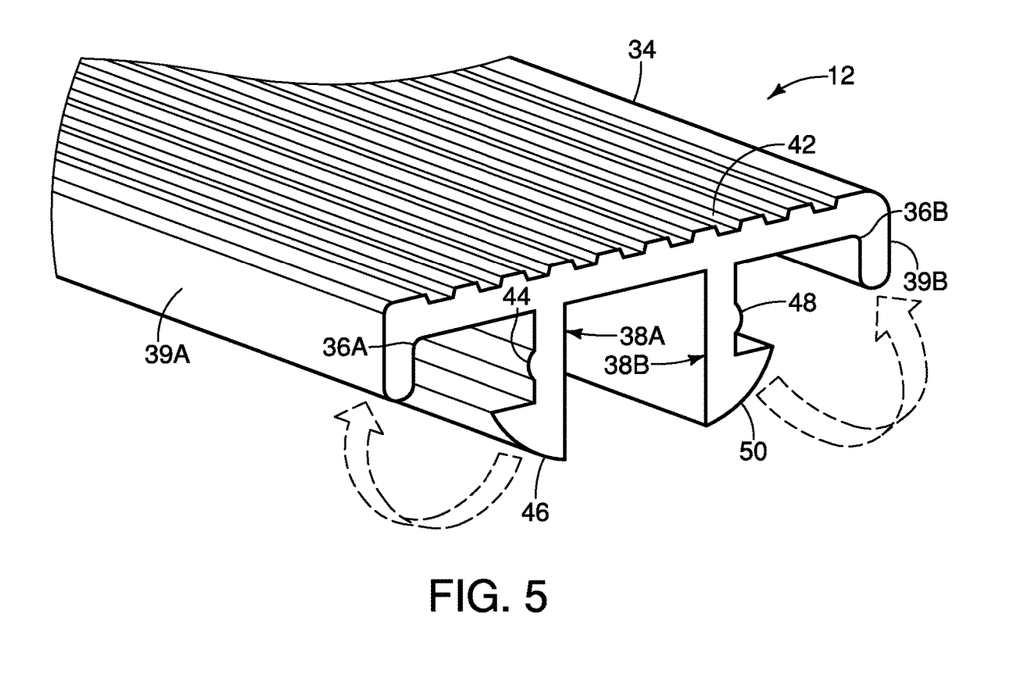
FIG. 5 is an enlarged view of a rear portion of the cargo management system showing only the utility track cover.

As best seen in FIG. 2, the base 36 of the utility track cover 34 is an elongated member that is rectangular shaped. As stated, the base 36 of the utility track cover 34 has the longitudinal length that substantially corresponds to the longitudinal length of the utility rail 20A to cover about the entirety of the floor channel 22A. As seen in FIGS. 4 and 5, the base 36 of the utility track cover 34 preferably includes a plurality ridges 42 or indentations for easy gripping by the user. The utility track cover 34 includes the first and second guide rails 38A and 38B that extend side-by-side along the longitudinal length of the base 36. Therefore, the utility track cover 34 of the illustrated embodiment includes the pair of guide rails 38A and 38B that project from the base 36 to be fitted into the floor channel of the utility rail 20A between the sidewalls 30A and 30B of the utility rail 20A.

As best seen in FIGS. 4 and 5, the base 36 has a pair of side edges 36A and 36B that are first and second side edges 36A and 36B that at lateral sides of the base 36. The first side edge 36A is disposed adjacent to the first guide rail 38A and is spaced from the first guide rail 38A. The second side edge 36B is disposed adjacent to the second guide rail 38B and is spaced from the second guide rail 38B. The utility track cover 34 further includes a pair of first and second side ribs 39A and 39B, extending the side edges 36A and 36B respectively. The first and second side ribs 39A and 39B extend along the longitudinal length of the base 36. Therefore, the base 36 and the side ribs 39A and 39B together have a cross-sectional profile that resembles a U shape such that the side ribs 39A and 39B are fitted over the sidewalls 30A and 30B of the utility rail 20A. However, it will be apparent to those skilled in the vehicle field from this disclosure that the utility track cover 34 can be made without the side ribs 39A and 39B as desired and/or necessary.

Figure 6:
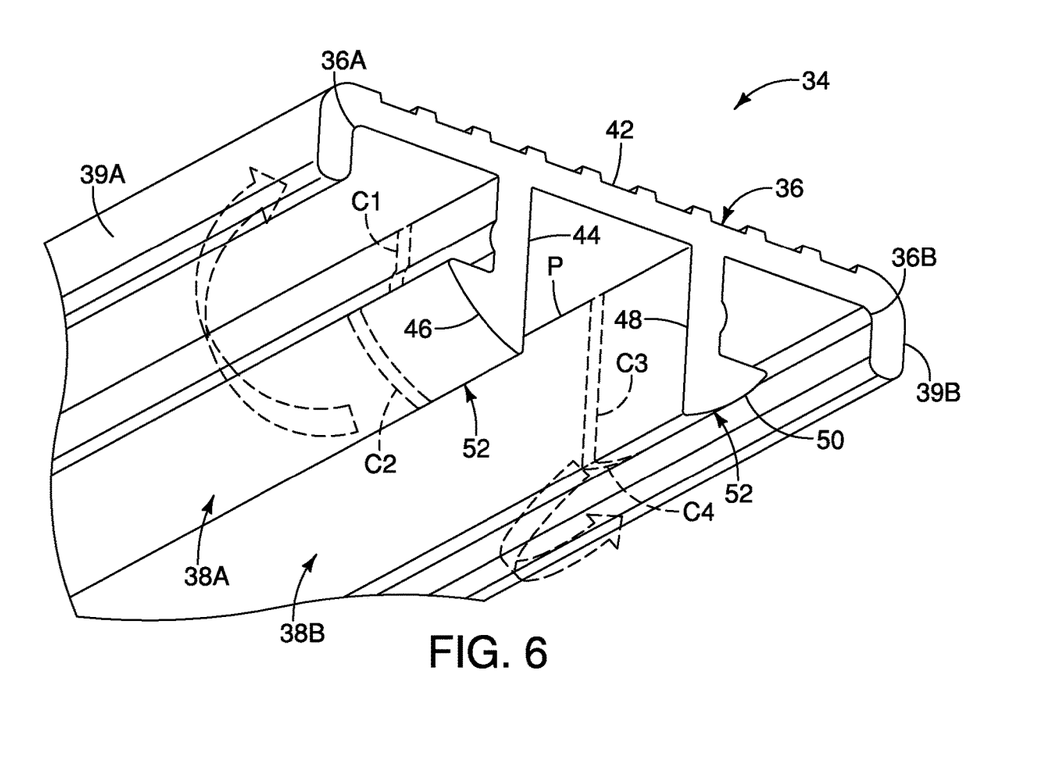
FIG. 6 is an enlarged view of a rear portion of the cargo management system showing an underside of the utility track cover.
Figure 7:
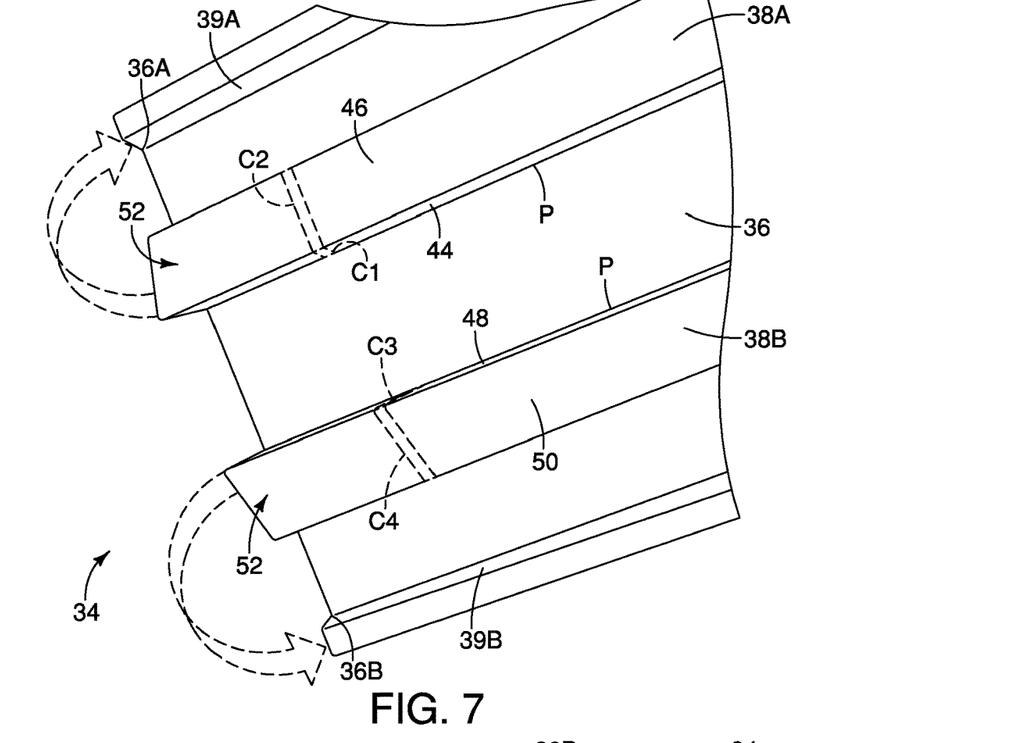
FIG. 7 is a top view of a portion of the utility track cover.
Figure 8:
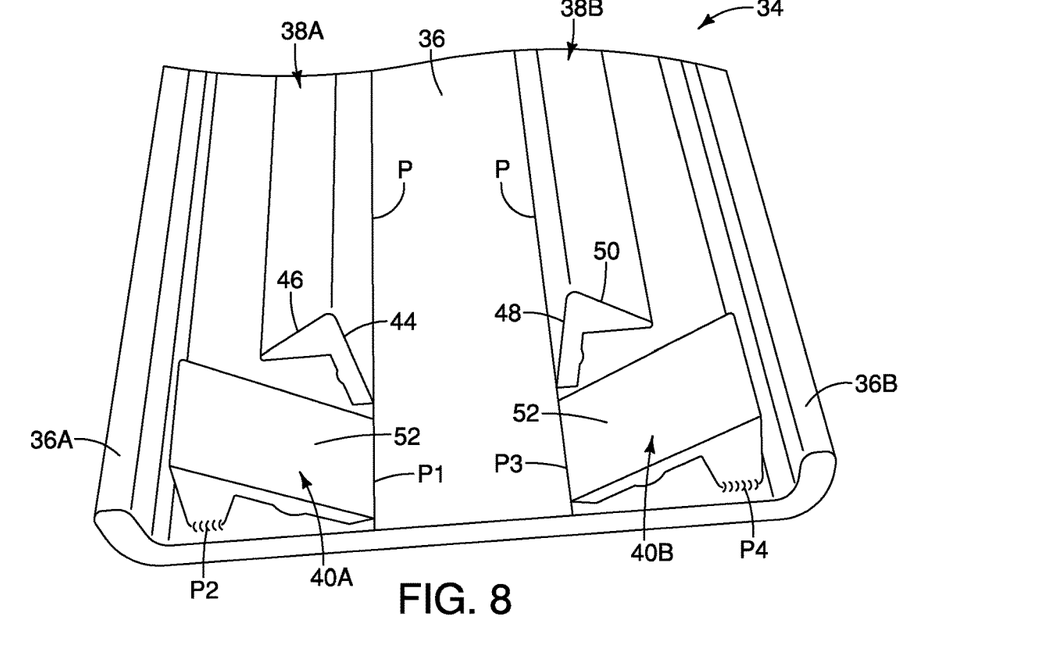
FIG. 8 is an enlarged view of a rear portion of the utility track cover having a pair of stoppers.

Also as best seen in FIGS. 4 and 5, the first guide rail 38A has a first extension 44 extending from the base 36 and a second extension 46 that extends from a tip of the first extension 44. As seen in FIGS. 6 to 8, the first extension 44 extends away from the base 36 and extends along the longitudinal length of the base 36. In other words, the first extension 44 protrudes from the base 36 along the entire longitudinal length of the base 36. The second extension 46 extends at an angle with respect to the first extension 44 and protrudes towards the first side edge 36A of the base 36. Similarly, the second guide rail 38B includes a third extension 48 extending from the base 36 and a fourth extension 50 that extends from the tip of the third extension 48. The third extension 48 extends along the longitudinal length of the base 36 and the fourth extension 50 extends at an angle with respect to the third extension 48 in a direction toward the second side edge 36B.

Referring to FIGS. 4 to 8, the stoppers 40A and 40B will be further discussed. The first stopper 40A is defined by the first guide rail 38A. Similarly, the second stopper 40B is defined by the second guide rail 38B. In particular, the stoppers 40A and 40B are formed with the first and second guide rails 38A and 38B and the base 36 by plastic extrusion of the utility track cover 34. The stoppers 40A and 40B are disposed on the rear side RR of the utility track cover 34 that is positioned closer to the vehicle's 10 rear side VR than to the vehicle's 10 front side VF. In other words, the stoppers 40A and 40B are considered portions of the end, or end portions 52, of the utility track cover 34.

The method of forming the utility track cover 34 comprises using plastic extrusion to form the base 36 and the guide rails 38A and 38B. Therefore, the utility track cover 34 is formed in a high-volume manufacturing process in which raw plastic (e.g., PVC) is melted and formed into a continuous profile. In particular, plastic or PVC material (in the form of pellets, granules, flakes or powders, etc.) are fed from a hopper into a barrel of the extruder. The material is gradually melted by the mechanical energy. The molten polymer is then forced into a die, which shapes the polymer into the shape of the utility track cover 34 that hardens during cooling.

In the illustrated embodiment, after the utility track cover 34 is extruded having the guide rails 38A and 38B and the base 36, the method for forming the utility track cover 34 further comprises cutting the ends of the guide rails 38A and 38B. Preferably, the guide rails 38A and 38B are cut at a length of 5 to 10 millimeters from the ends to form the stoppers 40A and 40B. In this way, the stoppers 40A and 40B are end portions of the guide rails 38A and 38B. Therefore, the stoppers 40A and 40B are preferably 5 to 10 millimeters in length. However, it will be apparent to those skilled in the vehicle field from this disclosure that the length of the stoppers 40A and 40B can vary as needed and/or desired.

The utility rails 20A and 20B can be cut by any appropriate tool as necessary, such as a saw, etc. As best seen in FIGS. 6 and 7, the first stopper 40A is formed by a first cut line C1 at the first extension 44 of the first guide rail 38A, and a second cut line C2 at the second extension 46 of the first guide rail 38A. In other words, the end portions 52 are cut from the guide rails 38A and 38B along the first and second extensions 44 and 46. Similarly with the second stopper 40B, the end portion 52 is made by a fourth cut line C4 at the third extension 48 and a fourth cut line C4 at the fourth extension 50.

The method further comprises applying force to the end portions 52 that were cut from the guide rails 38A and 38B such that the edges of the end portions 52 contact the base 36. In particular, the force is applied such that the second extension 46 of the first stopper 40A contacts the base 36, and the fourth extension 50 of the second stopper 40B contacts the base 36. In the illustrated embodiment, the force can be applied preferably using a weight that applies a 20 to 30 pound force to the stoppers 40A and 40B. However, it will be apparent to those skilled in the vehicle field from this disclosure that any appropriate weight or force can be used as necessary to bend the stoppers 40A and 40B. As best seen in FIG. 8, the method further comprises welding the edges of the second extension 46 and the fourth extension 50 to the base 36 by any appropriate welding means and methods.

In this way, the stoppers 40A and 40B are integrally connected to the base 36. As seen in FIG. 8, referring to the first stopper 40A, the first stopper 40A is integrally connected to the base 36 at a first contact point P1 and a second contact point P2 between the stopper 40A and the base 36. As best seen in FIGS. 7 and 8, the first contact point P1 of the first stopper 40A is aligned with a contact point or connection P between the guide rail and the base 36 along the longitudinal length of the base 36. In this disclosure, "contact point" will refer to a connection. Therefore, the first contact point P1 of the stopper is a connection P between the first stopper and the base 36. The first contact point P1 of the first stopper 40A is formed by plastic extrusion of the utility track cover 34. The second contact point P2 of the first stopper 40A is disposed adjacent to the first side edge 36A. The second contact point P2 of the first stopper 40A is welded to the base 36.

In the illustrated embodiment, the first and second contact points P1 and P2 are spaced from one another. It will be apparent to those skilled in the vehicle field from this disclosure that the first stopper 40A can be connected to the base 36 by a single continuous connection such that the first and second contact points P1 and P2 are not spaced but a single continuous connection with the base 36. It will also be apparent to those skilled in the vehicle field from this disclosure that the first stopper 40A can be connected to the base 36 at additional contact points. In this way, the first stopper 40A extends between the first guide rail 38A and the first side edge 36A.

Similarly, the second stopper 40B is integrally connected to the base 36 at a third contact point P3 and a fourth contact point P4 between the second stopper 40B and the base 36. The third and fourth contact points P3 and P4 are spaced from one another. As shown, the third contact point P3 is formed by plastic extrusion of the utility track cover 34. The fourth contact point P4 of the second stopper 40B is welded to the base 36. It will be apparent to those skilled in the vehicle field from this disclosure that the second stopper 40B can be connected to the base 36 by a single continuous connection such that the third and fourth contact points P3 and P4 are not spaced but a single continuous connection with the base 36. It will also be apparent to those skilled in the vehicle field from this disclosure that the second stopper 40B can be connected to the base 36 at additional contact points. In this way, the stoppers 40A and 40B are made by the same process with the rest of the components of the utility track cover 34. Therefore, the stoppers 40A and 40B are able to maintain a strong attachment with the base 36 that can withstand a greater force than the traditional stoppers.

Figure 9:
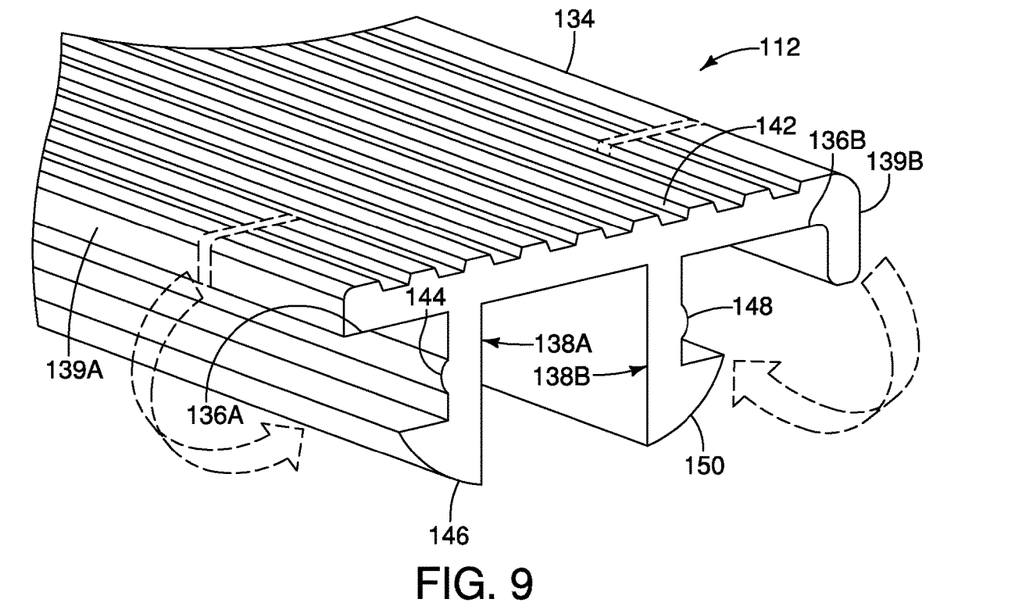
FIG. 9 is an enlarged view of a rear portion a first modified utility track cover.

Referring to FIG. 9, a first modified utility track cover 134 is illustrated. The first modified utility track cover 134 has a base 136 and a pair of modified guide rails 138A and 138B. The first modified track cover is basically identical to the utility track cover 34 but has a pair of first modified stoppers 140A and 140B. The first modified stoppers 140A and 140B are formed by cutting the base 136 and welding the ends of the base 136 to the ends of the modified guide rails 138A and 138B. In particular, the base 136 is cut at the surface of the base 136 and at the side ribs 139A and 139B of the 1base 36. A force is then applied to the cut end portions so that the cut end portions comes into contact with the guide rails 138A and 138B. The cut end portions are then welded to the guide rails 138A and 138B.

Figure 10:
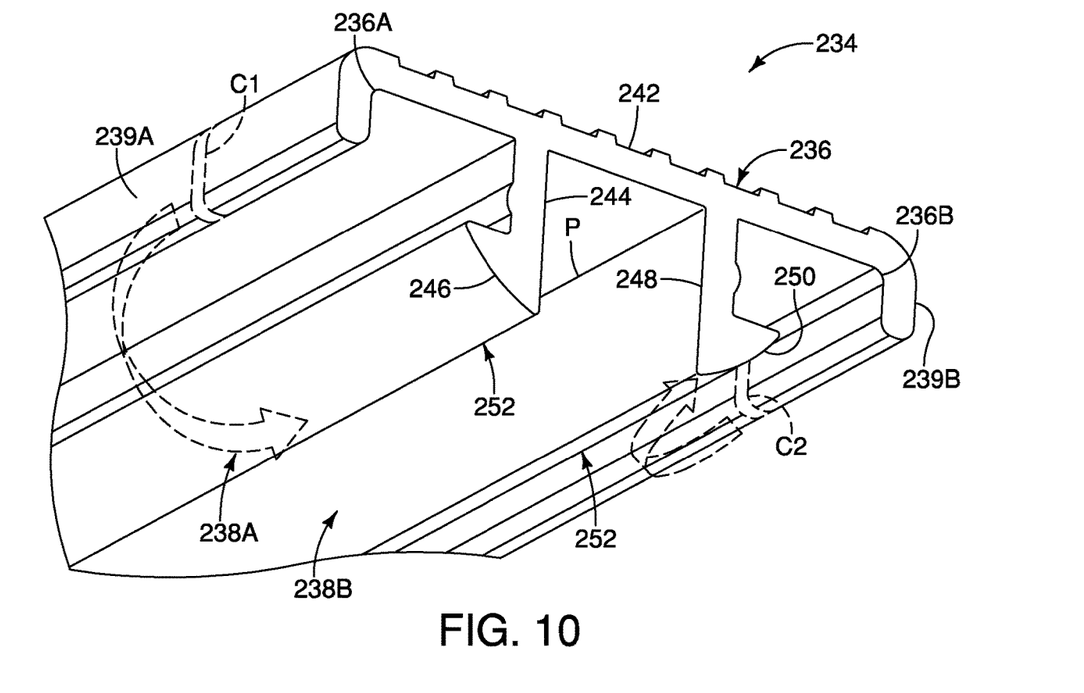
FIG. 10 is an enlarged view of a rear portion a second modified utility track cover.

Referring to FIG. 10, a second modified utility track cover 234 is illustrated. The second modified utility track cover 234 has a base 236 and a pair of modified guide rails 238A and 238B. The second modified track cover 234 is basically identical to the first modified utility track cover 134 but has a pair of second modified stopper 240A and 240B. The modified stoppers 240A and 240B are formed by cutting the base 236 and welding the ends of the base 236 to the ends of the modified guide rails 238A and 238B. In particular, the base 236 is cut only at the side ribs 239A and 239B of the base 236. A force is then applied to the cut end portions so that the cut end portions comes into contact with the guide rails 38A and 38B. The cut portions are then welded to the guide rails 238A and 238B. It will be apparent to those skilled in the vehicle field from this disclosure that the base 36, 136 and 236 and the guide rails 38A, 38B, 138A, 138B, 238A and 38B can be cut and welded towards each other to form stoppers of the illustrated embodiments.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the cargo management system. Accordingly, these terms, as utilized to describe the present invention should be interpreted relative to a vehicle equipped with the cargo management system.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cargo management system for a vehicle cargo box comprising:

a utility rail configured to be installed to the cargo box; and a utility track cover configured to be removably disposed over the utility rail, the utility track cover having
a base,
a guide rail extending along a longitudinal length of the base, and
a stopper defined by the guide rail, the stopper being integrally connected to the base at a first contact point and a second contact point between the stopper and the base, the first and second contact points being spaced from one another.

2. The cargo management system according to claim 1, wherein
the first contact point of the stopper being aligned with a contact point between the guide rail and the base along the longitudinal length of the base.

3. The cargo management system according to claim 2, wherein
the base having a side edge spaced from the guide rail, the stopper extending between the guide rail and the side edge.

4. The cargo management system according to claim 3, wherein
the second contact point of the stopper being disposed adjacent to the side edge.

5. The cargo management system according to claim 1, wherein
the stopper is formed with the guide rail and the base by plastic extrusion of the utility track cover.

6. The cargo management system according to claim 5, wherein
the first contact point of the stopper is formed by plastic extrusion of the utility track cover.

7. The cargo management system according to claim 6, wherein
the second contact point of the stopper is welded to the base.

8. The cargo management system according to claim 1, wherein
the utility cover includes another guide rail extending along the longitudinal length of the base, the utility track cover further having another stopper defined by the another guide rail, the another stopper being integrally connected to the base at a third contact point and a fourth contact point, the third and fourth contact points being spaced from one another.

9. The cargo management system according to claim 8, wherein
the third contact point of the another stopper is formed by plastic extrusion of the utility track cover, the fourth contact point of the another stopper is welded to the base.

10. A method of forming a utility track cover for a cargo management system, the method comprising:
using plastic extrusion to form a base and a guide rail having an extension that protrudes from the base and that extends along a longitudinal length of the base;
cutting an end portion of the guide rail;
applying force to an edge of the end portion such that the end portion contacts the base; and
welding the edge of the end portion to the base.

11. A vehicle comprising the cargo management system according to claim 1, wherein
the stopper is disposed on a vehicle rear facing side of the utility track cover that is positioned closer to the vehicle's rear end than to the vehicle's front end.

12. A utility track cover for a vehicle cargo management system, comprising:
a base;
a guide rail extending along a longitudinal length of the base; and
a stopper defined by the guide rail, the stopper, the base, the guide rail together being a one-piece member integrally formed by plastic extrusion.

13. The utility track cover according to claim 12, wherein
the base, the guide rail and the stopper are made of polyvinyl chloride.

14. The utility track cover according to claim 13, wherein
the stopper is integrally connected to the base at a first contact point and a second contact point between the stopper and the base, the first and second contact points being spaced from one another.

15. The utility track cover according to claim 14, wherein
the first contact point of the stopper is formed by plastic extrusion with the base, the second contact point of the stopper is welded to the base.

16. The utility track cover according to claim 15, further comprising
another guide rail extending along the longitudinal length of the base, and another stopper defined by the another guide rail, the another stopper being integrally connected to the base at a third contact point and a fourth contact point between the another stopper and the base, the third and fourth contact points being spaced from one another.

17. The utility track cover according to claim 16, wherein
the third contact point of the another stopper is formed by plastic extrusion with the base, the fourth contact point of the another stopper is welded to the base.

* * * * *